US012583591B2

(12) United States Patent

Nourrisson et al.

(10) Patent No.: US 12,583,591 B2
(45) Date of Patent: Mar. 24, 2026

(54) DE-ICING OF AN AIRCRAFT PART

(71) Applicant: SAFRAN NACELLES, Gonfreville-l'Orcher (FR)

(72) Inventors: Alain Nourrisson, Moissy-Cramayel (FR); Hakim Maalioune, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 18/567,329

(22) PCT Filed: Jun. 15, 2022

(86) PCT No.: PCT/FR2022/051150
§ 371 (c)(1),
(2) Date: Dec. 5, 2023

(87) PCT Pub. No.: WO2022/263770
PCT Pub. Date: Dec. 22, 2022

(65) Prior Publication Data

US 2025/0115362 A1 Apr. 10, 2025

(30) Foreign Application Priority Data

Jun. 15, 2021 (FR) ...................................... 2106335

(51) Int. Cl.
*B64D 15/16* (2006.01)
*B64D 33/02* (2006.01)

(52) U.S. Cl.
CPC ........... *B64D 15/163* (2013.01); *B64D 33/02* (2013.01); *B64D 2033/0233* (2013.01)

(58) Field of Classification Search
CPC ...................... B64D 15/163; B64D 2033/0233
See application file for complete search history.

(56) References Cited

U.S. PATENT DOCUMENTS

2010/0294882 A1* 11/2010 Gantie ................... F02C 7/045
244/1 N
2011/0011056 A1* 1/2011 Le Docte ............... B64D 33/02
60/39.093
(Continued)

FOREIGN PATENT DOCUMENTS

FR 2908738 A1 5/2008
FR 2922522 A1 4/2009
FR 3078948 A1 9/2019

OTHER PUBLICATIONS

International Search Report received for PCT Patent Application No. PCT/FR2022/051150, mailed on Oct. 11, 2022, 6 pages (2 pages of English Translation and 4 pages of Original Document).

*Primary Examiner* — Tye William Abell
(74) *Attorney, Agent, or Firm* — WOMBLE BOND DICKINSON (US) LLP

(57) ABSTRACT

A de-icing system which includes actuators attached to the part; and a device for controlling the actuators in order to vibrate the part. The control device is designed for the following, the actuators being divided into a plurality of groups: to control the actuators of a first one of the groups in order to establish a resonant frequency of the part; then to control the actuators of a second one of the groups in order to establish a resonant frequency of the part and, in parallel, to control the actuators of the first group in order to de-ice the part by vibrating it, using the resonant frequency established with this first group.

10 Claims, 9 Drawing Sheets

(56) References Cited

U.S. PATENT DOCUMENTS

| 2013/0032671 A1* | 2/2013 | Giles | B64C 11/16 |
| | | | 244/134 R |
| 2015/0292351 A1* | 10/2015 | Pereira | F01D 25/02 |
| | | | 219/205 |
| 2018/0216529 A1* | 8/2018 | Maalioune | B64D 15/04 |
| 2021/0078711 A1* | 3/2021 | Gonidec | B64D 15/163 |

* cited by examiner

[Fig. 1]
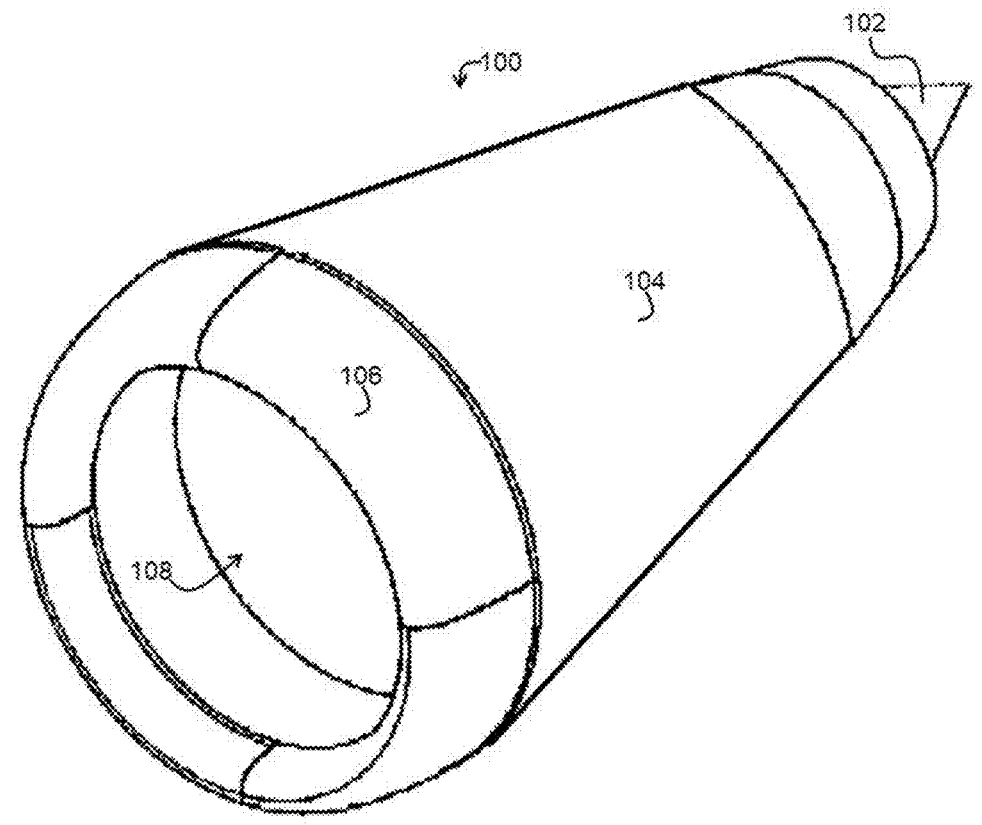

[Fig. 2]
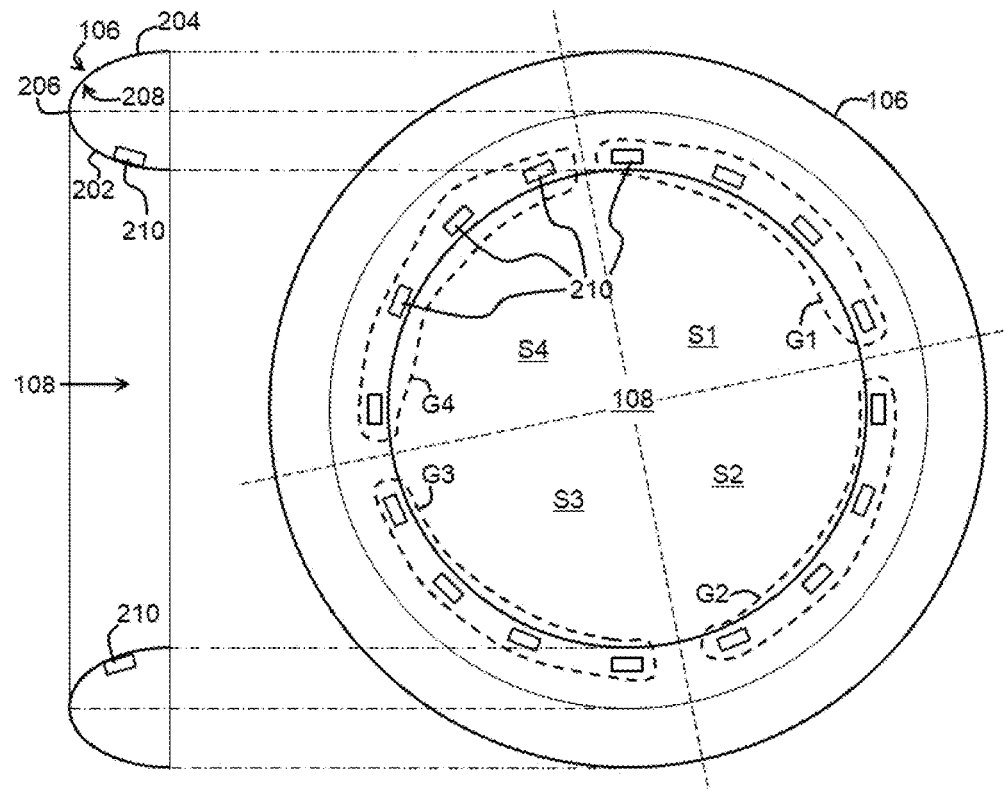

[Fig. 3]
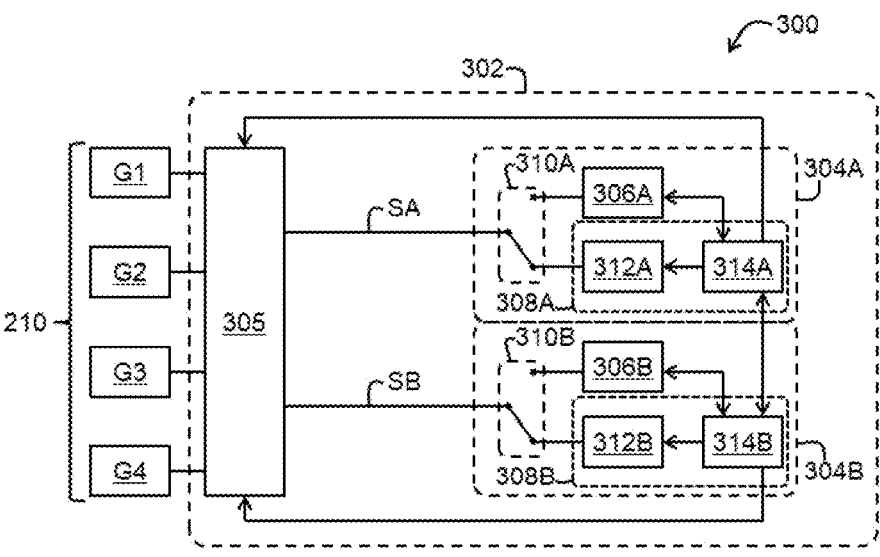

[Fig. 4]
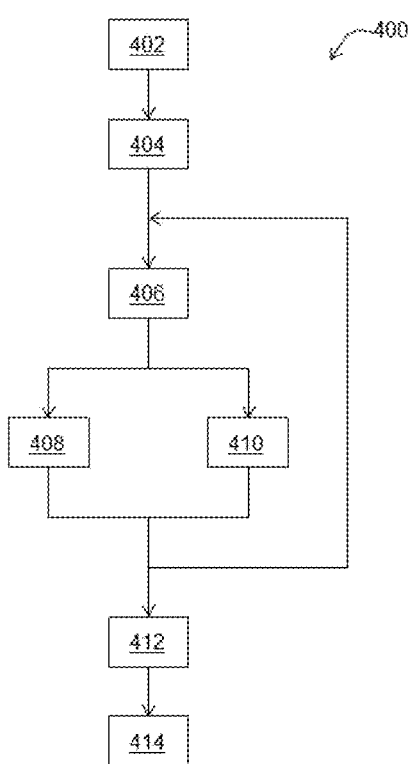

[Fig. 5]
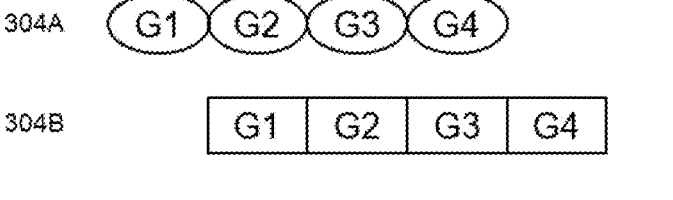

[Fig. 6]
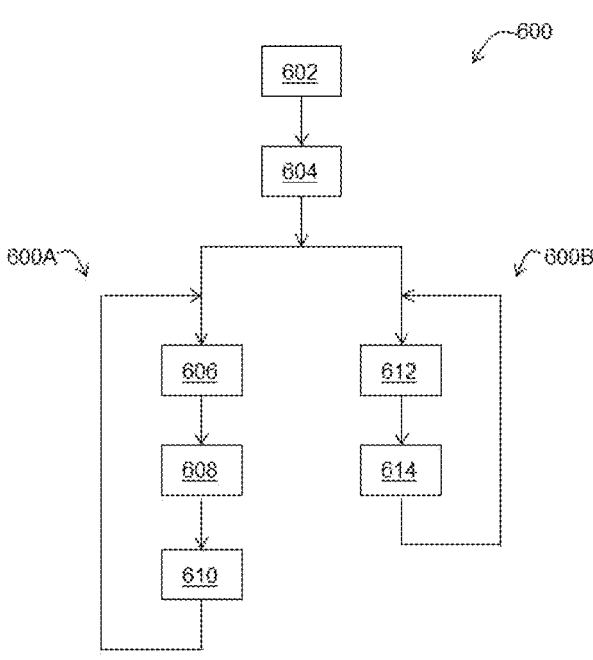

[Fig. 7]
304A
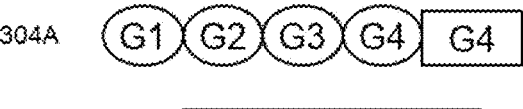
304B
t

[Fig. 8]
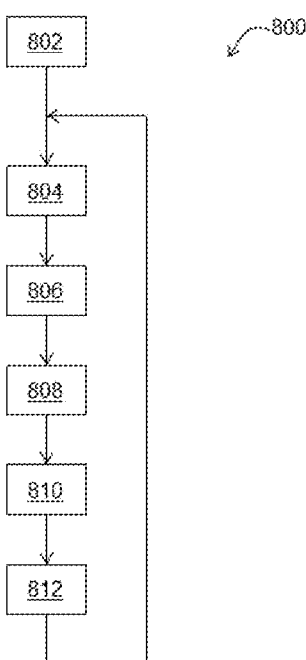

[Fig. 9]
304A
G1  G1  G2  G2  G3  G3  G4  G4
304B
t

DE-ICING OF AN AIRCRAFT PART

TECHNICAL FIELD OF THE INVENTION

The present invention relates to a de-icing system for de-icing a part of an aircraft, a nacelle of an aircraft equipped with such a de-icing system, an aircraft equipped with such a de-icing system, a method for de-icing a part of an aircraft and a corresponding computer program.

TECHNOLOGICAL BACKGROUND

The French patent application published under the number FR 3 078948 A1 describes a de-icing system for de-icing a part of an aircraft, comprising:

actuators attached to the part; and a control device for controlling the actuators to vibrate the part.

In this publication, the part to be de-iced is an air inlet lip of a nacelle of the aircraft and the actuators are piezoelectric actuators distributed along the length of this air inlet lip.

It may be desirable to reduce the de-icing time.

SUMMARY OF THE INVENTION

A de-icing system for de-icing a part of an aircraft is therefore proposed, comprising:

actuators attached to the part; and a control device for controlling the actuators for vibrating the part;

wherein the control device is designed for, the actuators being divided into a plurality of groups:

controlling the actuators of a first of the groups to determine a resonant frequency of the part; then on the one hand, controlling the actuators of a second of the groups to determine a resonant frequency of the part and, on the other hand, in parallel, controlling the actuators of the first group to de-ice the part by vibrating it, using the resonant frequency determined with this first group.

Thanks to the invention, the resonant frequency with the actuators of the second group is determined during the de-icing via the actuators of the first group. This overlap allows to reduce the total de-icing time.

Optionally, the part is a part of a nacelle of the aircraft.

Also optionally, the part is an air inlet lip of the nacelle of the aircraft.

Also optionally, the actuators are also piezoelectric actuators.

Also optionally, with the groups following one another in sequence, the control device is designed for, in parallel:

controlling the actuators of one group after the other in sequence, to determine a resonant frequency of the part in each case; and controlling the actuators of one group after the other in sequence, to de-ice the part each time by vibrating it, using the resonant frequency determined with this group.

Also optionally, the control device is designed for:

controlling the actuators of the first group to determine a resonant frequency of the part; then to successively for each of the other group or groups:

controlling the current group to determine a resonant frequency of the part and, in parallel, controlling the previous group to de-ice the part by vibrating it, using the resonant frequency determined with this previous group; then controlling the actuators of the last group to de-ice the part by vibrating it, using the resonant frequency determined with this last group.

Also optionally, the control device is designed to start determining a resonant frequency of the part with the next group, without waiting for the end of the de-icing of the part with the current group.

Also optionally, the control device comprises first and second calculators, the first calculator being designed to carry out the step or steps of determining the resonant frequency of the part and the second calculator being designed to carry out the step or steps of de-icing the part.

Also optionally, the first calculator is designed, once the resonant frequencies have been determined with all the groups, to carry out at least one of the de-icing step or the de-icing steps not yet carried out by the second calculator.

Also optionally, each calculator is further designed to, in response to a failure of the other calculator:

controlling the actuators of a first of the groups to determine a resonant frequency of the part; then to successively, in order of succession, for each of the other groups:

controlling the actuators of the previous group to de-ice the part by vibrating it, using the resonant frequency determined with this previous group, then controlling the actuators of the current group to determine a resonant frequency of the part; then controlling the actuators of the last group to de-ice the part by vibrating it, using the resonant frequency determined with this last group.

A nacelle for an aircraft is also proposed, comprising:

an air inlet lip; and a de-icing system according to the invention for de-icing the lip.

An aircraft is also proposed comprising:

a part on which ice is likely to appear; and a de-icing system according to the invention for de-icing this part.

A method for de-icing a part of an aircraft is also proposed, comprising:

controlling the actuators of a first group of actuators attached to the part, to determine a resonant frequency of the part; then on the one hand, controlling the actuators of a second group of actuators attached to the part to determine a resonant frequency of the part and, on the other hand, in parallel, controlling the actuators of the first group to de-ice the part by vibrating it, using the resonant frequency determined with this first group.

A computer program is also proposed comprising instructions for implementing the method according to the invention, when executed by a computer.

BRIEF DESCRIPTION OF THE FIGURES

The invention will be better understood with the aid of the following description, given solely by way of example and made with reference to the appended drawings in which:

FIG. 1 is a three-dimensional view of a nacelle of an aircraft,

FIG. 2 is a cross-sectional view and a rear view of an air inlet lip of the nacelle in FIG. 1, FIG. 3 is a functional view of an example of a de-icing system according to the invention for de-icing the air inlet lip of FIG. 2, FIG. 4 is a block diagram of steps in a first example of a de-icing method according to the invention for de-icing the air inlet lip of FIG. 2, FIG. 5 is a timeline illustrating the sequence of the steps in the method shown in FIG. 4, FIG. 6 is a block diagram of steps in a second example of a de-icing method according to the invention for de-icing the air inlet lip of FIG. 2, FIG. 7 is a timeline illustrating the sequence of the steps in the method shown in FIG. 6, FIG. 8 is a block diagram of steps in an example of a de-icing method for de-icing the air inlet lip of FIG. 2, in the event of failure of a portion of the system of FIG. 3, and FIG. 9 is a timeline illustrating the sequence of the steps in the method shown in FIG. 8.

DETAILED DESCRIPTION OF THE INVENTION

FIG. 1 shows a nacelle 100 of an aircraft with a turboshaft engine 102 inserted in it.

The nacelle 100 comprises a tubular envelope 104 surrounding the turboshaft engine 102 and, along a perimeter of a front end of the tubular envelope 104, a lip 106 delimiting an air inlet 108.

With reference to FIG. 2, the lip 106 is generally folded into a "V" shape so as to have a central wall 202 and a peripheral wall 204 meeting at a front summit 206. In particular, the lip 106 has an internal face 208.

The nacelle 100 also comprises actuators 210 attached to the internal face 208 of the lip 106. For the sake of clarity, only some of the actuators are referred to as 210. In the example described, these actuators 210 are attached to the portion of the internal face 208 extending over the central wall 202 of the lip 106. However, in other embodiments, all or some of the actuators 210 could be attached to the portion of the internal face 208 extending over the peripheral wall 204.

The actuators 210 are preferably piezoelectric. In FIG. 2, sixteen actuators 210 are shown but, in practice, there may be many fewer or more, for example from four to over a hundred.

Still in the example described, the actuators 210 are distributed along the lip 106 so as to follow each other around the air inlet 108. In this way, the actuators 210 are, for example, arranged in a circle, preferably evenly spaced from one another.

The actuators 210 are divided into several groups, for example four groups G1, G2, G3, G4. In practice, many more groups could be planned. Preferably, the groups G1-4 are distinct, which means that each actuator 210 belongs to only one of the groups G1-4. This arrangement allows to optimise the number of interconnection harnesses and their lengths. Even more preferably, the groups G1-4 include substantially the same number of actuators 210 (to within the tolerance, e.g. within 10%), so as to maintain the same load for the converter across all the groups and be able to detect the loss of one or more actuators. For example, the groups G1-4 group together the actuators 210 located respectively in angular sectors S1, S2, S3, S4 of the lip 106.

With reference to FIG. 3, a de-icing system 300 for de-icing the lip 106 of the nacelle 100 will now be described in more detail.

Within the meaning of the present invention, the term "de-icing" includes not only removing ice that has already formed, but also preventing the formation of ice before it occurs (anti-icing). Furthermore, the term "de-icing" covers only partial de-icing of the de-iced part (the lip 106 in the example described).

The de-icing system 300 firstly comprises the actuators 210 described above.

The de-icing system 300 also comprises a control device 302 for controlling the actuators 210.

In the example described, the control device 302 comprises two calculators 304A, 304B each having an output SA, SB, and a multiple switch 305 designed to selectively connect each group G1-4 to the output SA of the calculator 304A or to the output SB of the calculator 304B, or to disconnect this group G1-4.

The calculators 304A, 304B will now be described in more detail. Each calculator 304A, 304B comprises an analysis module 306A, 306B and a de-icing module 308A, 308B.

Each calculator 304A, 304B also comprises a local switch 310A, 310B for selectively connecting the analysis module 306A, 306B and the de-icing module 308A, 308B to its output SA or SB. Thus, with the multiple switch 305 and the local switch 310A, 310B, it is possible to connect each of the groups G1-4 either to the analysis module 306A of the calculator 304A, or to the de-icing module 308A of the calculator 304A, or to the analysis module 306B of the calculator 304B, or to the de-icing module 308B of the calculator 304B.

Each analysis module 306A, 306B is designed to determine a resonant frequency of the lip 106 by controlling the group G1-4 to which it is connected. In the example described, this resonant frequency is substantially that of the sector S1-4 of the lip 106 comprising the actuators 210 of the connected group G1-G4. The resonant frequency can vary according to the length of the harnesses, the ambient temperature, the variation in the characteristics of the components due to their heating, and the amount of ice present, and the analysis module 306A, 306B can be used to update the resonant frequency.

The desired resonant frequency is preferably a high frequency, for example between 10 kHz and 200 kHz. It is therefore preferable to determine the resonant frequency with a high degree of accuracy and robustness to a small variation around this frequency.

To determine this resonant frequency, the analysis module 306A, 306B can use several analysis methods.

In a first analysis method, the analysis module 306A, 306B is designed to search for the resonant frequency by frequency sweeping.

In the case where the actuators 210 are piezoelectric, the analysis module 306A, 306B is designed, for example, to apply to the actuators 210 of the connected group G1-4 a sinusoidal excitation voltage with a frequency sweeping a predefined interval in a given time, for example between 10 kHz and 200 kHz. From the current measured in the piezoelectric actuators 210, the analysis module 306A, 306B is then designed to calculate the impedance as a function of frequency and to determine the resonant frequency as the frequency where the impedance is minimum. This first analysis method is referred to as "Chirp sine sweep based piezo-impedance measurement" and uses the voltage and current values as a function of the variation of the frequency to directly deduce the impedance after filtering. It therefore does not require complex calculations for each frequency step, as is the case with a discrete Fourier transform.

In a second analysis method, the analysis module 306A, 306B is designed to determine the resonant frequency by frequency analysis.

In the case where the actuators 210 are piezoelectric, the analysis module 306A, 306B is designed, for example, to apply a periodic or pulsed excitation voltage in order, in response, to obtain a frequency spectrum from the measurement of the current in the piezoelectric actuators, for example by means of a Fourier transform, for each frequency. The analysis module 306A, 306B is then designed to determine the frequency of the largest peak in the frequency spectrum, this frequency being the desired resonant frequency.

In order to limit the power consumption of the de-icing system 300, each analysis module 306A, 306B is preferably designed to apply low voltage excitation voltages, for example between 0 and 50 V (peak to peak).

Each analysis module 306A, 306B comprises, for example, a Field-Programmable Gate Array (FPGA) or a Digital Signal Processing (DSP) unit.

Each de-icing module 310A, 310B is designed to de-ice the lip 106 by making it vibrate, controlling the actuators 210 of the group G1-4 to which it is connected. In particular, in the example described, the de-icing is carried out each time by vibrating mainly the sector S1-4 corresponding to the connected group G1-4, while the other sectors may vibrate little or not at all.

More precisely, the de-icing module 310A, 310B is designed to control the actuators 210 of the connected group using the resonant frequency previously determined with this group by one of the analysis modules 306A, 306B.

In a first example, the de-icing module 310A, 310B is designed to excite the actuators 210 of the connected group G1-4, for a predefined duration, at an excitation frequency equal to the determined resonant frequency or derived by the de-icing module 310A, 310B from the determined resonant frequency.

In a second example, the de-icing module 310A, 310B is designed to start exciting the actuators 210 of the connected group G1-4, at the resonant frequency (or at a frequency derived by the de-icing module 310A, 310B from the determined resonant frequency), and then to vary the excitation frequency to follow the resonant frequency. As de-icing progresses, the quantity of ice on the lip 106 decreases, for example as a result of pieces of frost lifting off, which can modify the resonant frequency. The heating of the components of the power converter during the de-icing can also modify the resonant frequency to be applied.

For example, the de-icing module 310A, 310B may use the Maximum Point Tracking Method. The principle of this method is to insert a small low-frequency variation in the control around the high-frequency operating point of the piezoelectric actuators. The aim is to control the phase between the injected low-frequency signal and the low-frequency variation in output power. The output power provided is calculated from a measurement of a current flowing through the actuators 210 of the connected group G1-4 and the voltage applied to the actuators 210 of the connected group G1-4. A low-pass filter allows to preserve the low-frequency power variation. If the injected signal is in phase with the calculated output power, then the slope is positive and the power tends towards the maximum power. If the two variations are in phase opposition, then the slope is negative and the output power decreases. In this way, the controllable frequency will automatically move towards a stable resonant frequency corresponding to the maximum power provided to the actuators that will deliver a maximum mechanical force to the air inlet structure.

In the case where the actuators 210 are piezoelectric, the de-icing module 310A, 310B is designed, for example, to apply an excitation voltage at the excitation frequency. The excitation voltage is preferably high voltage, i.e. it has a higher peak-to-peak value than the low-voltage excitation voltage used by the analysis module. This peak-to-peak value is greater than 50 V, for example, and preferably greater than 100 V.

For example, each de-icing module 310A, 310B comprises a power converter 312A, 312B and a module 314A, 314B for controlling the power converter 312A, 312B.

Each power converter 312A, 312B is for example designed to supply the sinusoidal excitation voltage from a DC voltage, for example from a respective Auto Transformer Rectifier Unit (also referred to by the acronym ATRU). The control module 314A, 314B comprises, for example, a microcontroller or a programmable gate array (FPGA).

In some embodiments, the control device 302 comprises a computing device equipped with a data processing unit (such as a microprocessor) and a main memory associated with the data processing unit. A computer program comprising instructions is intended to be loaded into the main memory, so that the data processing unit executes these instructions and thus implements one or more of the modules 305, 306A, 308A, 310A, 312A, 314A, 306B, 308B, 310B, 312B, 314B. These modules are therefore software modules.

With reference to FIG. 4, a first example 400 of a de-icing method will now be described. In addition, the groups G1-4 are assumed to be ordered in succession (G1, then G2, then G3, then G4 in the example described) in the control device 302.

During a step 402, the multiple switch 314 and the local switches 310A, 310B connect the analysis module 306A to the actuators 210 of the first group G1 and, for example, disconnect the actuators of the other groups G2-4 from the control device 302.

During a step 404, the analysis module 306A controls the actuators of the first group G1 to determine a resonant frequency of the lip 106, and transmits the resonant frequency to the de-icing module 308B. In the example described, the analysis module 306A transmits this resonant frequency to the control module 314A which retransmits it to the control module 314B.

The steps 406 to 410 are then implemented successively for each of the other groups G2-4.

In a step 406, the multiple switch 314 and the local switches 308A, 308B connect the actuators 210 of the current group to the analysis module 306A and the actuators of the previous group to the de-icing module 308B and, for example, disconnect the actuators of the other groups from the control device 302.

During a step 408, the analysis module 306A controls the actuators 210 of the current group to determine a resonant frequency of the lip 106, and transmits the resonant frequency determined with the current group to the de-icing module 308B. In the example described, the analysis module 306A transmits this resonant frequency to the control module 314A which retransmits it to the control module 314B.

In parallel with the step 408, during a step 410, the de-icing module 308B controls the actuators 210 of the previous group to de-ice the lip 106 by vibrating it, using the resonant frequency determined by the analysis module 306A with this previous group.

In a step 412, the multiple switch 305 and the local switches 310A, 310B connect the actuators of the last group G4 to the de-icing module 308B and, for example, disconnect the actuators of the other groups G1-3 from the control device 302.

During a step 414, the de-icing module 310B controls the actuators 210 of the last group G4 to de-ice the lip 106 by vibrating it, using the resonant frequency determined by the analysis module 306A with this last group G4.

FIG. 5 illustrates the alternation over time (t) of the analysis (oval) and de-icing (rectangular) steps during the implementation of the de-icing method 400.

As can be appreciated, the de-icing method 400 does not use the modules 306B and 308A. In this way, they can be omitted from the control device 302. However, they are useful for continuing to be able to de-ice in the event of failure of one of the calculators 304A, 304B, as will be described below with reference to FIGS. 8 and 9.

With reference to FIG. 6, a second example 600 of a de-icing method will now be described.

In this second example, the control device 302 is still designed for, in parallel: controlling the actuators 210 of one group after the other in the order of succession, each time to determine a resonant frequency of the lip 106, and controlling the actuators 210 of one group after the other in the order of succession to de-ice the lip 106 by causing it to vibrate, using the resonant frequency determined with this group. However, this time the control device 302 is designed to start determining a resonant frequency of the lip 106 with the next group, without waiting for the end of de-icing of the lip 106 with the current group.

More precisely, in the example described, during a step 602, the multiple switch 305 and the local switches 310A, 310B connect the actuators 210 of the first group G1 to the analysis module 306A and, for example, disconnect the actuators 210 of the other groups G2-4 from the control device 302.

During a step 604, the analysis module 306A controls the actuators 210 of the first group G1 to determine a resonant frequency of the lip 106, and transmits this resonant frequency to the de-icing module 308B.

The loops of steps 600A and 600B are carried out in parallel.

The first loop of steps 600A is carried out successively for each group G2-G3 of actuators 210.

In a step 606, the multiple switch 314 and the local switch 310A connect the actuators 210 of the current group to the analysis module 306A.

During a step 608, the analysis module 306A controls the actuators 210 of the current group to determine a resonant frequency of the lip 106, and transmits the resonant frequency determined to the de-icing modules 308A, 308B. In the example described, the analysis module 306A transmits this resonant frequency to the control module 314A which retransmits it to the control module 314B.

During a step 610, the de-icing module 308A controls the actuators of a group of actuators 210 that the de-icing module 308B has not yet controlled, in order to de-ice the lip 106 by causing it to vibrate. The step 610 may be carried out several times, as long as the actuators 210 of all the groups G1-4 have not been controlled to de-ice the lip 106, either by the de-icing module 308A or by the de-icing module 308B (see below).

The second loop of steps 600B is carried out successively for each group G1-G4, unless this group has already been used in the step 610 to de-ice the lip 106.

In a step 612, the multiple switch 314 and the local switch 310B connect the actuators 210 of the current group to the de-icing module 308B.

In a step 614, the de-icing module 308B controls the actuators of the current group to de-ice the lip 106 by vibrating it, using the resonant frequency determined by the analysis module 306A with this current group.

FIG. 7 illustrates the alternation over time (t) of the analysis (oval) and de-icing (rectangular) steps during the implementation of the method 600.

As can be seen in this figure, the analysis steps may be shorter than the de-icing steps, so that the calculator 304A can quickly finish the analysis for all the groups G1-4 and can then, in step 610, help the calculator 304B to finish de-icing. In the example described, the calculator 304A can start de-icing with the actuators 210 of the last group G4 while the calculator 304A is still de-icing with the actuators of the group G3. All in all, the de-icing is therefore quicker.

With reference to FIG. 8, a third example of a de-icing method will now be described.

During a step 802, one of the calculators 304A, 304B detects that the other has failed. In the remainder of the description, it will be assumed that the calculator 304B has failed. If the calculator 304A were to fail, the method 800 would be identical, with the A and B suffixes reversed.

The following steps are then carried out for each group G1-4 of actuators 210, according to an order of succession of the groups G1-4.

In a step 804, the multiple switch 314 and the local switch 310A connect the actuators 210 of the current group to the analysis module 306A.

During a step 806, the analysis module 306A controls the actuators 210 of the current group to determine a resonant frequency of the lip 106.

In a step 808, the multiple switch 314 and the local switch 310A connect the actuators 210 of the current group to the de-icing module 308A.

In a step 810, the de-icing module 308A controls the actuators of the current group to de-ice the lip 106 by vibrating it, using the resonant frequency determined with this current group.

In this way, a complete de-icing can be obtained with only the calculator 304A or 304B still healthy.

FIG. 9 illustrates the alternation over time (t) of the analysis (oval) and de-icing (rectangular) steps during the implementation of the de-icing method 800.

It should be noted that the invention is not limited to the embodiments described above. Indeed, it will be apparent to the person skilled in the art that various modifications can be made to the above-described embodiments, in the light of the teaching just disclosed.

In particular, the steps of the methods described above may be carried out in any possible sequence (which may include steps carried out in parallel).

In addition, the actuators could be divided into several assemblies of groups such as the groups G1-G4 described above. Each assembly would then comprise several groups of actuators. The groups in the same assembly would be controlled as described above.

For example, there could be four assemblies of sixteen groups each, making a total of sixty-four groups.

For example, if the method in FIG. 5 is used to control the groups in each assembly, with the assemblies controlled synchronously with each other, the following sequence could be obtained:

the first group of each assembly determines a resonant frequency, then the first group in each assembly carries out a de-icing at the resonant frequency it has determined, and at the same time the second group of each assembly determines a resonant frequency, then the second group in each assembly carries out a de-icing using the resonant frequency it has determined, and at the same time the third group in each assembly determines a resonant frequency, then and so on.

Alternatively, the control of the groups could be asynchronous from one assembly to another. In other words, the groups in each assembly would be controlled independently of the groups in the other assemblies.

In the detailed presentation of the invention made above, the terms used should not be interpreted as limiting the invention to the embodiments set forth in the present description, but should be interpreted to include all equivalents the anticipation of which is within the reach of the person skilled in the art by applying his general knowledge to the implementation of the teaching just disclosed.

The invention claimed is:

1. A de-icing system for de-icing a part of an aircraft, comprising:

actuators divided into at least two groups and attached to the part; and a control device comprising first and second calculators;

wherein the first calculator successively controls the actuators of each of the groups to determine a resonant frequency of the part for each said group; and the second calculator successively controls the actuators of each of the groups to de-ice the part by vibrating the part, using the resonant frequency of the part for said group determined by the first calculator, wherein the controlling by the second calculator at least partially overlaps the controlling by the first calculator; and wherein the first calculator in response to a failure of the second calculator, to successively control the actuators of each of the groups to de-ice the part by vibrating the part, using the resonant frequency of the part for said group determined by the first calculator, the first calculator successively controls the actuators of each of the groups to de-ice the part by vibrating the part, using the resonant frequency of the part for said group determined by the first calculator.

2. The de-icing system according to claim 1, wherein the part is a part of a nacelle of the aircraft.

3. The de-icing system according to claim 1, wherein the actuators are piezoelectric actuators.

4. The de-icing system according to claim 1, wherein the part is an air inlet lip of the nacelle of the aircraft.

5. The de-icing system according to claim 1, wherein the second calculator, in response to a failure of the first calculator to successively control the actuators of each of the groups to determine a resonant frequency of the part for each said group, the second calculator successively controls the actuators of each of the groups to determine a resonant frequency of the part for each said group; and the second calculator successively controls the actuators of each of the groups to de-ice the part by vibrating the part, using the resonant frequency of the part for said group determined by the second calculator.

6. A nacelle for an aircraft, comprising:

an air inlet lip; and a de-icing system according to claim 1, for de-icing the lip.

7. An aircraft comprising:

a part on which ice is likely to appear; and a de-icing system according to claim 1, for de-icing this part.

8. A method for de-icing a part of an aircraft using at least two groups of actuators attached to the part, comprising:

successively controlling the actuators of each of the groups to determine a resonant frequency of the part for said group with a first calculator;

successively controlling with a second calculator the actuators of each of the groups to de-ice the part by vibrating the part using the resonant frequency of the part for said group determined by the first calculator, wherein the controlling by the second calculator at least partially overlaps the controlling by the first calculator; and in response to a failure of the second calculator to de-ice the part by vibrating the part using the resonant frequency of the part for said group determined by the first calculator, successively controlling with the first calculator the actuators of each of the groups to de-ice the part by vibrating the part using the resonant frequency of the part for said group determined by the first calculator.

9. The method of claim 8, further comprising:

in response to a failure of the first calculator successively controlling the actuators of each of the groups to determine a resonant frequency of the part for said group with the first calculator, successively controlling with the second calculator the actuators of each of the groups to determine the resonant frequency of the part for said group with the second calculator;

successively controlling with the second calculator the actuators of each of the groups to de-ice the part by vibrating the part using the resonant frequency of the part for said group determined by the second calculator.

10. A computer program comprising instructions for implementing the method of claim 8, when executed by a computer.

* * * * *